(12) United States Patent
DeRonne et al.

(10) Patent No.: US 6,974,251 B2
(45) Date of Patent: Dec. 13, 2005

(54) AMBIENT AIR TEMPERATURE PREDICTION

(75) Inventors: Michael J. DeRonne, Beverly Hills, MI (US); Joshua J. Barhitte, Flint, MI (US); William Western, Howell, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/392,220

(22) Filed: Mar. 18, 2003

(65) Prior Publication Data

US 2004/0184509 A1  Sep. 23, 2004

(51) Int. Cl.$^7$ .............................................. G01K 13/00
(52) U.S. Cl. ...................................... 374/144; 374/141
(58) Field of Search ............................... 374/141, 163, 374/144, 100; 702/153

(56) References Cited

U.S. PATENT DOCUMENTS

| | | | | |
|---|---|---|---|---|
| 5,001,656 A | * | 3/1991 | Zimmerman et al. | 700/299 |
| 5,416,728 A | * | 5/1995 | Rudzewicz et al. | 702/130 |
| 6,026,784 A | * | 2/2000 | Weisman et al. | 123/436 |
| 6,088,661 A | * | 7/2000 | Poublon | 702/130 |
| 2005/0075823 A1 | * | 4/2005 | Park | 702/130 |

FOREIGN PATENT DOCUMENTS

JP       06033819 A  *  2/1994  .......... F02D 45/00

* cited by examiner

*Primary Examiner*—Gail Verbitsky
*Assistant Examiner*—Mirellys Jagan
(74) *Attorney, Agent, or Firm*—Christopher DeVries

(57) ABSTRACT

Methods and apparatus are provided for predicting ambient air temperature (PAT) around a vehicle (and partly controlling vehicle operation) based on Mass Air Flow (MAF), Vehicle Speed (VSS), Inlet Air Temperature (IAT), Engine Run Time (ERT) and the last PAT value (LPAT). If MAF, VSS are below thresholds C1, C2 and ERT is below threshold C4, then PAT is set equal to the smaller of IAT or LPAT. If MAF,VSS,ERT exceed C1, C2, C4, as for example, in steady run operation, then after an interval PAT approaches IAT−C5+/−C6 where C5 and C6 are stored parameters. An idle counter increments when MAF<C1, VSS<C2 is TRUE and decrements by parameter C3 when FALSE and must reach zero before the PAT steady run value is set. This improves prediction accuracy during transition from idle to steady state running. The PAT estimation process is repeated about every 10 seconds.

18 Claims, 2 Drawing Sheets

100
AMBIENT AIR TEMPERATURE PREDICTION

FIELD OF THE INVENTION

The present invention generally relates to prediction of ambient air temperature, and more particularly to prediction of ambient air temperature around a vehicle for use in determining vehicle operation.

BACKGROUND OF THE INVENTION

Modern vehicles use a variety of sensors to measure parameters needed to control the engine, transmission, fuel system, exhaust system and other vehicle parts. A number of tests must also be performed to satisfy the many state and federal vehicle emission and fuel efficiency regulations. For example, an Engine Off Natural Vacuum (EONV) test must be performed on the vehicle fuel system each time the engine is shut off. This test is intended to detect leaks in the fuel system that might allow liquid fuel or fuel vapors to escape into the atmosphere. The test is performed by automatically closing the fuel system air vent when the engine is shut off and then monitoring the fuel tank over pressure P(t) as a function of time. If the P(t) profile matches the "normal" profile stored in the vehicle's engine management system computer memory or other computer memory, then the fuel system is considered to be substantially leak free, that is, the EONV test is passed.

As may be appreciated, the pressure P(t) in the fuel tank also depends upon the ambient temperature $T_a$ since this affects the temperature of the fuel remaining in the tank and therefore the overpressure in the vapor space in the tank as a function of time. This means that P is a function of both ambient temperature $T_a$ and time t. Thus, $P=P(T_a,t)$.

The simplest way of dealing with the temperature dependence would be to place an Ambient Air Temperature (AAT) sensor on the vehicle and use the observed AAT value in evaluating $P(T_a,t)$. Most modern vehicles have a number of temperature sensors already installed, as for example, a temperature sensor to measure Intake Air Temperature (IAT) for the engine and a sensor to determine the Radiator Coolant Temperature (RCT) and so forth. But these temperature sensors are significantly influenced by their proximity to the hot engine and do not, by themselves, give reliable readings of the Ambient Air Temperature (AAT). A sensor to specifically measure AAT is not normally found on a most vehicles and it is desirable if at all possible to avoid having to add an additional temperature sensor for this purpose because of the additional cost involved.

Accordingly, a need continues to exist to be able to estimate or predict the Ambient Air Temperature (AAT) surrounding the vehicle, using other sensors already on-board for other purposes, without adding significant additional cost. Further, it is desirable that the means and method adopted for estimating or predicting the AAT be adaptable to a wide variety of vehicle and engine types. Estimated or predicted AAT values may be used for a variety of purposes in addition to the EONV test mentioned above. These and other desirable features and characteristics of the present invention will become apparent from the subsequent detailed description of the invention and the appended claims, taken in conjunction with the accompanying drawings and this background of the invention.

BRIEF SUMMARY OF THE INVENTION

A method is provided for obtaining a Predicted Ambient Temperature (PAT) of air around a vehicle for controlling vehicle operation, based on Intake Air Temperature (IAT), vehicle speed (VSS), intake airflow (MAF), engine run time (ERT) and Last Predicted Ambient Temperature (LPAT), comprising: setting PAT=the smaller of IAT or LPAT when MAF, VSS and ERT are below respective thresholds and for a further interval while MAF, VSS and ERT are equal to or above their respective thresholds; when the further interval expires, adding an offset value to IAT to obtain an offset temperature; and determining PAT from said offset temperature. In a further embodiment, the determining step comprises setting PAT equal to the offset temperature minus or plus an incremental temperature according to whether or not the LPAT exceeds the offset temperature.

There is provided an apparatus for controlling in part operation of a vehicle using a Predicted Ambient Temperature (PAT) value, comprising: a processor; a memory coupled to the processor; interface units coupled to the processor and the memory for vehicle operating variables MAF, VSS, IAT, ERT and LPAT; a prediction program residing in the memory and being executed by the processor for providing the PAT of air surrounding the vehicle, wherein the prediction program executes the method described in the preceding paragraph.

There is further provided a program product comprising the program method described in the preceding paragraphs and a signal bearing media bearing such program method.

BRIEF DESCRIPTION OF THE DRAWINGS

The following drawings are illustrative of particular embodiments and therefore do not limit the scope of the invention. They are presented to assist in providing a proper understanding of the invention. The drawings are not to scale (unless so stated) and are intended for use in conjunction with the explanations in the following detailed description. The present invention will hereinafter be described in conjunction with the accompanying drawings, wherein like referenced numerals denote like elements, and.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the drawings.

The means and method of the present invention relies on the use of pre-existing on-board sensors in conjunction with certain predetermined stored calibration constants, thresholds and interpolation techniques to correct the temperatures measured by the existing on-board temperature sensor(s), so as to accurately predict or estimate the AAT. The abbreviation PAT means the Predicted Ambient (air) Temperature and the abbreviation LPAT means the Last Predicted Ambient (air) Temperature.

Figure 1:
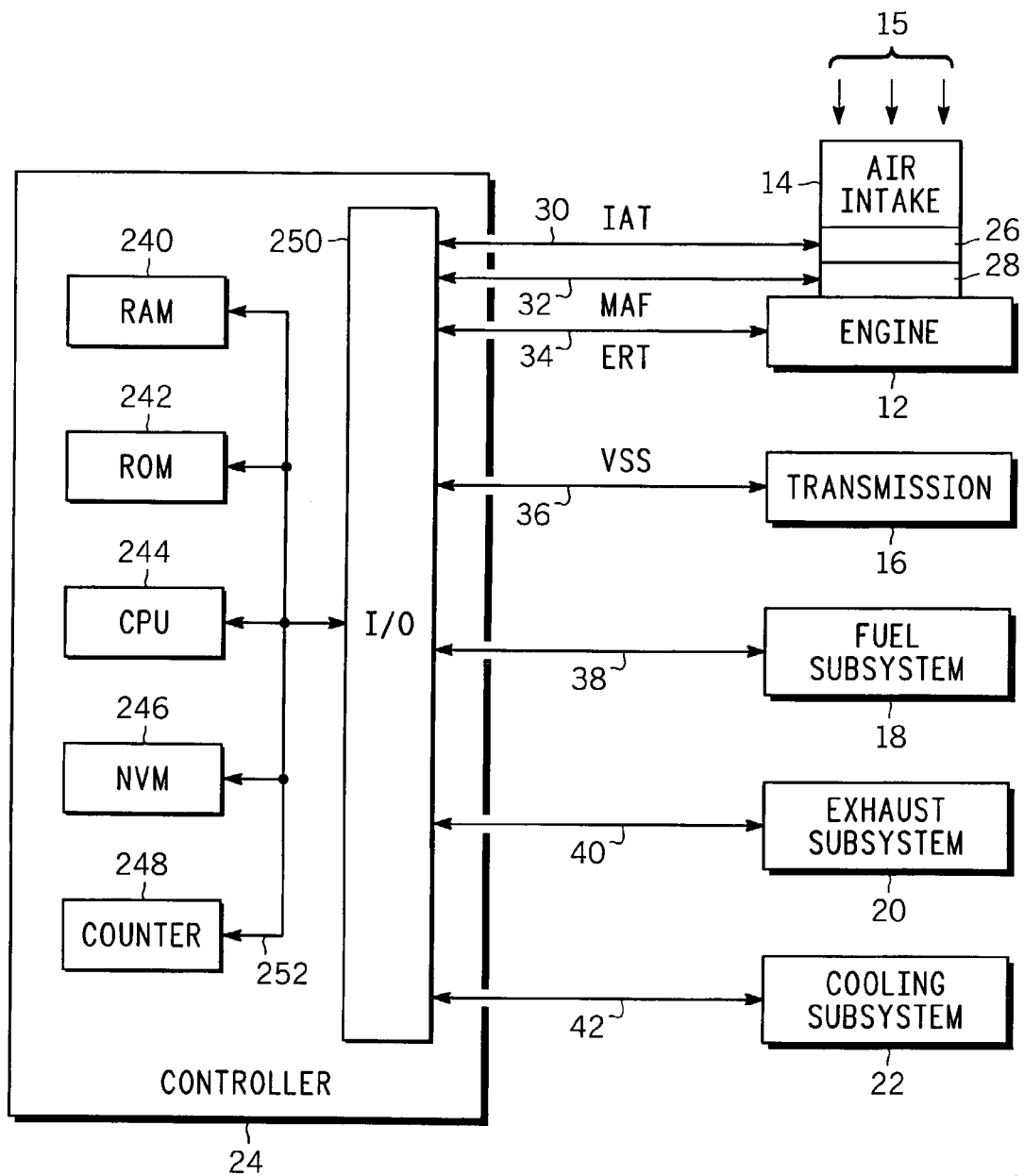
FIG. 1 is a simplified schematic diagram of a computer system used in connection with the management of various mechanical and electrical systems in a vehicle.

FIG. 1 is a simplified schematic diagram of system 10 used in the operation of a vehicle. System 10 comprises engine 12 with air intake system 14 receiving air 15, transmission 16, frel system 18, exhaust system 20, cooling system 22 and system controller 24. Located in air intake system 14 are IAT sensor 26 and Mass Air Flow (MAF) sensor 28. IAT sensor 26 and MAF sensor 28 communicate with controller 24 via leads or buses 30, 32 respectively. Bus or lead 34 between engine 12 and controller 24 is exemplary and merely indicates that Engine Run Time (ERT) information is available to controller 24. Those of skill in the art will understand that ERT may be generated or measured in a variety of places within system 10 and it is not intended that this invention be limited by the source of ERT information. For example, lead 34 may merely provide an indication that engine 12 is "ON" so that controller 24 can calculate ERT using an internal clock or time base. Any engine ON signal or source for ERT values will suffice. Lead 36 indicates that Vehicle Speed (VSS) information is available to controller 24. Lead 36 running from transmission 16 to controller 24 is merely exemplary and not limiting. VSS can be measured in transmission 16 or elsewhere in the vehicle and any source of VSS values will suffice. Fuel subsystem 18 is coupled to controller 24 via bus or leads 38, exhaust subsystem 20 is coupled to controller 24 by bus or leads 40 and cooling subsystem 22 is coupled to controller 24 by bus or leads 42. Other vehicle subsystems (not shown) may also be coupled to controller 24. Inputs from fuel subsystem 18, exhaust subsystem 20 and cooling sub system 22 are not essential to the operation of the present invention, even though the PAT values generated by controller 24 may be used in connection with such subsystems.

Controller 24 comprises Random Access Memory (RAM) 240, Read Only Memory (ROM) 242, Central Processing Unit (CPU) 244, Non Volatile Memory (NVM) 246, counter 248 and I/O 250, coupled by bus 252. The exact design of controller 24 is not critical so long as it is capable of performing the tasks subsequently described in connection with process flow chart 100 of FIG. 2. Counter 248 may be a hardware or software counter.

Figure 2:
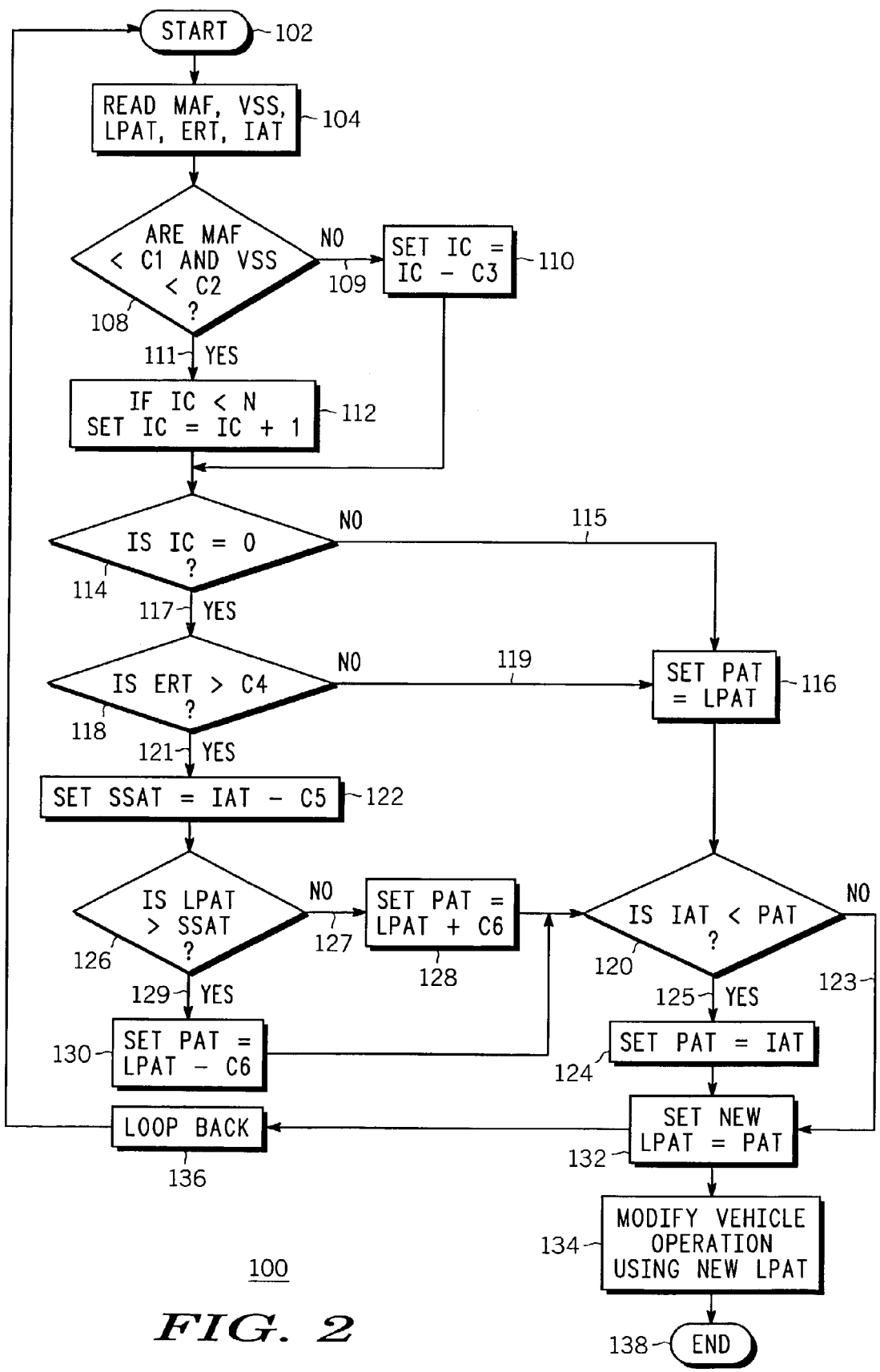
FIG. 2 is a simplified process flow chart according to the present invention for use in connection with the system of FIG. 1.

FIG. 2 is shows simplified process flow chart 100 according to the present invention for use in connection with controller 24 of FIG. 1 and various input variables from other parts of the system, to determine a current Predicted Ambient (Air) Temperature (PAT) for use by vehicle management system 10. While it is not essential, it is intended that process flow 100 be repeated, with the parameter "Loop Time" (abbreviated LT) defining how frequently process flow 100 is repeated. LT is conveniently about 10 seconds, i.e., process flow 100 repeats about every 10 seconds of vehicle operation, but larger or smaller values can also be used.

Beginning with START 102, in step 104, controller 24 reads operating variables MAF, VSS, LPAT, ERT and IAT (see FIG. 1). MAF is the Mass Air Flow into air intake 14 or any parameter which correlates with air flow 15 not just mass air flow alone, transmitted for example to controller 24 via input bus or lead 32. VSS is the vehicle speed or any parameter that correlates with vehicle speed, transmitted for example, to controller 24 via input bus or lead 36. LPAT is the Last Predicted Ambient Temperature value generated by system 10 and method 100 and stored in memory 240 or 246 of controller 24. Engine Run Time (ERT), e.g., how long the engine has been running, is determined by controller 24 for example in connection with input bus or lead 34. Intake Air Temperature (IAT) is determined by controller 24 for example via input bus or lead 30.

As used herein, the words "read" or "reads" whether capitalized or not, are intended to include any means or method of determining values for MAF, VSS, LPAT, ERT and IAT. Those of skill in the art will understand that some of these values may be determined from various sensors coupled to controller 24 while others are determined within controller 24 or elsewhere as a result of calculation or other evaluation based on an input from a sensor or other data transmitter, or in other ways. Thus, it is intended that any means and method for evaluating these variables will suffice and such are intended to be included in the scope of the present invention.

It will be further understood by those of skill in the art that IAT and MAF may be measured elsewhere than in the engine air intake (although that is preferred) and that it is intended that the abbreviations IAT and MAF be understood in this broader sense to refer to moving air whose temperature and flow rate are affected by operation of the engine and whose values correlate with the AAT to provide useful PAT values. Similarly, it will be understood that VSS may be any variable that correlates with vehicle speed and ERT any variable that correlates with engine run time and that the abbreviations VSS and ERT are used herein in this broader sense. It will also be understood that quantities MAF, VSS, LPAT, ERT and IAT may be read in any order and at different times in process 100. All that is necessary is that MAF and VSS be read before step 108, ERT before step 118, IAT before steps 120, 122 and LPAT before steps 116, 126.

Query step 108 uses the MAF and VSS values obtained in step 104 and determines whether MAF exceeds a first threshold constant or reference value C1 and VSS exceeds a second threshold constant or reference value C2. C1 and C2 are conveniently stored in memory 242 or 246 of controller 24 or elsewhere. C1 and C2 are threshold values that determine whether the IAT values should be adjusted or modified to obtain PAT. The results of query step 108 are used in steps 110, 112 depending on whether the outcome of query 108 is "NO" (FALSE) or "YES" (TRUE). If the outcome of query step 108 is "YES" (TRUE) as indicated by link 111, then in step 112 idle counter 248 of controller 24 increments by 1 if IC<N. The abbreviation "IC" is used to represent the value held by idle counter 248. As will be explained later in more detail, N determines in part how fast or slowly system 10 switches from using an uncorrected IAT value for PAT to using an adjusted or compensated IAT value for PAT. The value of N is conveniently set at about N=100 although larger or smaller values can also be used. As long as idle counter 248 is greater than zero, PAT will remain unchanged, that is PAT=IAT or LPAT, whichever is lower. For the example where N=100 and LT=10 seconds, then IC=N=100 corresponds to 10×100=1000 seconds=16.7 minutes. Thus, system 10 keeps track of how long MAF, VSS have been in low flow, low velocity conditions for any time period up to 16.7 minutes. By selecting smaller or larger values of N, this time period may be made shorter or longer.

If the outcome of query 108 is "NO" (FALSE) as indicated by link 109, then in step 110 idle counter 248 is decremented by a multiplier value C3. C3 is obtained from memory 242 or 246 or elsewhere in system 10. Its value depends upon the value of MAF determined in step 104. The larger the MAF value, typically the larger the value of C3 that should be used. In general, the decrement multiplier parameter C3 and the increment limit N determine how rapidly the PAT determination process changes from PAT=IAT or LPAT, whichever is lower, to a compensated steady state value (SSAT) determined from IAT modified by stored adjustment parameters C5, C6, as will be subsequently explained. The effect of C3 is to increase or decrease the rate at which the idle counter counts down. Typically the idle counter should count down faster at high MAF values because the elevated IAT from previous idle conditions (low VSS and MAF) will diminish faster with high MAF values.

The idle counter acts to delay switching from PAT=IAT or LPAT, whichever is lower, to the SSAT values generated in steps 122–128, when vehicle operation shifts from near idle conditions with elevated IAT temperatures. These elevated IAT values associated with low MAF and VSS are more variable due to factors such as wind and sun load. The combination of C1, C2, and C3 control the idle counter and how long use of the steady state prediction values should be delayed because of low speed, low flow conditions. Values for C3 are obtained by empirical measurements correlating AAT and PAT for different values of MAF as vehicle operating conditions change, e.g., switch from low MAF, VSS conditions or vice versa. Convenient values are C3=0.5 to about 2, depending on MAF, the larger the MAF the larger the value of C3 that should be used. As used herein, the words "low flow, low speed" means query 108 yields "YES" (TRUE) and "high flow, high speed" means query 108 yields "NO" (FALSE).

By way of example, to illustrate how N and C3 interact to provide variable delays depending on the vehicle operating history and current conditions, during which PAT remains at the lesser of IAT or LPAT, assume that low flow, low speed conditions have persisted for duration=t1−t0 minutes where t1−t0=16.7 minutes or more so that IC=N=100 with LT=10 seconds. Then, at about t=t1 minutes, vehicle operation switches to high flow, high speed conditions and, in step 110, IC begins decrementing by amount C3 each loop time, e.g., each LT=10 seconds. PAT remains at the lesser of IAT or LPAT until IC=0. If the current MAF value is high and, for example, C3=2, and LT=10 seconds, then IC will count down from IC=N=100 in (10×100)/2=500 seconds=8.3 minutes. If the current MAF value is barely above C1 and, for example, C3=0.5, then IC will count down from IC=N=100 in (10×100)/0.5=2000 seconds=33.3 minutes. Thus the invented system provides PAT=smaller of IAT or LPAT while low flow, low speed conditions persist and during a further delay period depending on the combination of the duration of low speed, low flow conditions and the magnitude of the current flow conditions, once low flow, low velocity conditions cease.

The results of SET steps 110 and 112 go to query step 114 wherein it is determined whether or not IC equals zero. Idle counter 248 is arranged to never become negative, that is, IC is never less than zero. Only when the idle counter IC=0 and ERT>C4 is the SSAT value set in step 122. If the output of query step 114 is "NO" (FALSE) as shown by link 115, then SET step 116 is carried out wherein PAT is set equal to LPAT.

If the output of query 114 is "YES" (TRUE) and the output of query 118 is "YES" (TRUE) then, as shown by links 117, 121 control is passed to step 122. In query step 118, it is determined whether the ERT value read or acquired in step 104 is larger than a threshold constant C4, i.e., a minimum run time generally chosen to assure that the engine is fully warmed up. As used herein the words "low time" mean query 118 yields "NO" (FALSE) and "high time" means query 118 yields "YES" (TRUE).

If the result of query step 118 is "NO" (FALSE), i.e., the engine is not warmed up yet, then as shown by link 119, step 116 is carried out. Step 116 follows from a "NO" (FALSE) output from either query 114 or query 118, and the LPAT is retained as PAT (SET PAT=LPAT). Then along with the results from steps 128, 130 discussed below, query 120 is used to determine whether IAT is less than the PAT values generated by any of steps 116, 128, 130. If the output of query step 120 is "NO" (FALSE) as shown by link 123, then the PAT value determined in steps 116, 128 or 130 is passed to step 132. If the output of query step 120 is "YES" (TRUE) as shown by link 125, then in step 124, PAT is set equal to IAT and that value is passed to step 132. In other words, in steps 120, 124 if the IAT value is cooler than the PAT set in steps 116, 128 or 130, then the IAT value is used as the new PAT, if not, then the PAT value set in 116, 128 or 130 is used for PAT. Only one value of PAT ends up being sent to step 132: (a) either LPAT (from step 116) or LPAT+C6 (from step 128) or LPAT−C6 (from step 130), sent via link 123, or (b) IAT (from step 124).

If the result of query step 118 is "YES" (TRUE) as shown by link 121, then in step 122 a Steady State Ambient Temperature (SSAT) value is defined by subtracting a constant C5, dependant on VSS and MAF, from the measured IAT value determined in step 104. The magnitude of off-set or compensation parameter C5 is chosen dependent upon MAF, VSS using observed MSF, VSS values determined in step 104 and a matrix of MAF, VSS and C5 values stored in memory. In general, the higher the MAF, VSS values, the smaller the value of C5 retrieved from the stored matrix of values. This is because higher VSS and larger MAF tend to reduce the difference between the AAT and the IAT.

The result of step 122 is passed to query step 126 wherein it is determined whether the LPAT value obtained in step 104 is greater than the SSAT value determined in step 122. If the answer to query step 126 is "NO" (FALSE) as shown by link 127, then in step 128 an offset parameter C6 dependant on the observed MAF value is added to the LPAT value obtained in step 104 to provide an updated PAT value which is passed to step 120. If the output of query step 126 is "YES" (TRUE) as shown by link 129, then in step 130 the offset parameter C6 is subtracted from the LPAT value obtained in step 104 to yield the new PAT value, and the result passed to step 120. Passing the results of steps 128, 130 to query 120 is not essential and these results can pass directly to step 132. It is not anticipated that the outcome of steps 128, 130 should ever make query 120 TRUE, but since query 120 needs to be present to test the output of step 116, it adds no significant cost to use it for the output of steps 128, 130 as well. Thus, feeding the output of steps 128, 130 to step 132 via query 120 is the preferred but not essential implementation.

In step 132, the PAT value obtained as a result of previous steps 116, 124, 128 or 130 (and query 120) is used to update the LPAT value stored in memory 240 or 246 of controller 24 and the updated LPAT value is used in step 134 by the vehicle control system as the AAT value for various operations performed by system 10, as for example, the EONV test previously described. As shown by loop-back 136, PAT prediction or estimation process 100 is desirably repeated by system 10 as often as is needed to have available current PAT and LPAT values for use by system 10 or other engine or vehicle management system. For example, it is desirable that Loop Time LT is about 10 seconds, but larger or smaller values can also be used. Each time that process 100 repeats a new value of PAT is generated depending upon the currently observed variables MAF, VSS, ERT, IAT, the stored value LPAT and parameters C1–C6, N so that PAT and LPAT are updated for use by system 10 and LPAT during the next iteration of process 100.

The various offset, threshold or multiplier parameters C1–C6, N used in process 100 are empirically determined by correlating PAT with MAF, VSS, ERT, IAT values and actual ambient temperature (AAT) values, to minimize the differences between PAT and AAT. In general, C1 is a threshold MAF value, C2 is a threshold VSS value, C4 is a threshold ERT value and C3 is a multiplier value to control the transition from low flow, low speed PAT estimates (IAT or LPAT) to fully warmed-up engine and high flow, high speed PAT values (, e.g., IAT−C5+/−C6).

Process 100 of FIG. 2 in conjunction with system 10 of FIG. 1 will predict the ambient air temperatures around a vehicle without having to have an ambient air temperature sensor on the vehicle. Process 100 takes into account various vehicle operating condition. When the vehicle is substantially in steady state condition (e.g., high flow, speed and time) the process defines a SSAT value based on the IAT compensated by offset parameter C5 (SSAT =IAT-C5) to take into account the difference difference between AAT and IAT from the heat of the engine. The value of the offset parameter C5 is determined by operating the vehicle under warmed-up driving conditions and measuring the difference between AAT and IAT as a function of VSS, MAF. A data table can then be drawn up having VSS and MAF as orthogonal axes so that for each combination of observed VSS and MAS values, an empirically determined C5 value is obtained for use in step 122. Persons of skill in the art will understand how to do this based on the explanation given herein. This data matrix is stored in memory 242 or 246 of controller 24 or elsewhere. Correction parameter C6 is empirically determined in much the same manner as for C5.

As process 100 is repeated under high flow, speed and time conditions, steps 126, 128, 130 cause the PAT value to walk incrementally by amount C6 from, for example, LPAT to SSAT and thereafter remain at SSAT +/−C6. Thus the use of parameter C6 and steps 126, 128, 130 has the effect of controlling the rate of change in PAT as the vehicle enters into and remains at high flow, speed and time conditions. Thus, the present invention better accommodates variations in vehicle operating conditions. The parameters N, C3 control delays (how many loop times) before the PAT transition from low flow, low speed to high flow, high speed condition begins, and C6 controls how long (e.g., how many loop times) the transition takes.

As can be understood from the foregoing discussion, there are three situations when the SSAT value is not used: (a) when the engine is not warmed up (low time condition) as determined by comparing the ERT value and the ERT threshold C4, (b) when the MAF and VSS are too low (low flow, low speed conditions) as defined by the threshold values C1, C2 (112 makes IC>0), and (c) when MAF, VSS are in high flow, high speed conditions but IC is still greater than zero (e.g., count-down in step 110 has started but not yet reached zero). For either (a), (b) or (c) PAT is set equal to LPAT unless IAT is smaller than LPAT whereupon PAT is set equal to IAT. It is desirable that under all circumstances, if IAT is less than PAT, PAT is set equal to IAT.

When the MAF and VSS values are high enough to equal or exceed C1 and C2 respectively, then idle counter 248 decrements by amount C3 for each cycle of process 100 until it reaches zero. Then the SSAT value is used again (see step 122 and following). C3 is chosen in much the same way as the other correction or threshold parameters by correlation of empirical measurements of vehicle operating variables MAF and VSS with PAT and AAT values. C3 is obtained from a look-up table in memory 242 or 246 or elsewhere.

By way of example and not intended to be limiting, for a typical full-sized V8 powered truck, the following values of C1–C6, N are useful:
C1=about 5 gms/sec;
C2=about 20 MPH;
C3=about 0.5 to 2, depending on MAF, counts per software loop;
C4=about 10 minutes;
C5=about 5 to 40 degrees Centigrade, depending on MAF, VSS;
C6=about 0.1 degrees depending on MAF, VSS;
N=about 100 counts.

In general, the values of C1–C6, N are different for different vehicle and engine models. A virtue of the present invention is that these parameters allow the method to be applied to vehicles of all types, where differing C1–C6, N values provide compensation adapted for the individual vehicle types so that the PAT values are accurate and reliable under a wide range of operating conditions.

As each cycle of process flow 100 repeats while the vehicle is in the high speed, high flow conditions, idle counter 248 counts down until it reaches zero. The rate at which it counts down depends on C3. The value of C3 used depends on MAF, the larger the value of MAF the large the parameter C3 that should be used. C3 is a look-up value obtained from memory depending on the current MAF value. The idle counter is time based depending on Loop Time LT. When enough loops occur under these conditions, IC eventually reaches zero.

With respect to ERT, if the engine has been running less than about C4 minutes, the engine compartment and surrounding parts have not warmed up enough to skew the IAT significantly. Therefore, for an ERT less than about C4 minutes, the IAT value is used for the PAT if it is less than the LPAT value previously determined.

As each cycle of process flow 100 repeats while the vehicle is in low speed, low flow conditions, idle counter 248 counts up. The longer the operating conditions remain in the low flow, speed situation, the higher the IC value up to a maximum of N. The PAT values remain equal to the smaller of IAT of LAPT. When vehicle operation switches from low speed, low flow to high speed, high flow the onset of PAT=IAT−C5+/−C6 value is delayed while idle counter 248 counts down from whatever count value was reached during low flow, low speed operation until it reaches zero. Then, provided that ERT>C4, PAT transitions from IAT or LPAT to SSAT−C5+/−C6. The effect of using idle counter 248 in the manner described above is to delay the onset of the beginning of the change in PAT values toward steady state behavior. Thus, system 10 and process 100 are adaptive, that is, the PAT values depend upon the near history of vehicle operating conditions and current operating conditions in a dynamic way. This significantly improves the PAT accuracy.

When MAF, VSS equal or exceed threshold values C1, C2 and the engine has been running long enough, idle counter 248 eventually reaches zero and then the filtered steady state prediction determined in steps 122, 126, 128, 130 is used. The SSAT value is based on the IAT offset by amount C5 (step 122). The PAT values will then be a filtered version of the SSAT. Given enough time at constant MAF, VSS exceeding thresholds C1, C2, the PAT will be equal to SSAT +/−C6. C6 is a calibration value based on airflow and is typically 0.1 degrees Centigrade but larger or smaller values can also be used. Process 100 increments PAT by amount C6 every loop time LT (e.g., every 10 seconds).

Thus, C6 controls the filter or transition rate between LPAT and SSAT. C6 is determined while collecting data for C5. When transitioning between low and high speed/flow driving conditions, C6 is set to make the transition of PAT similar to how IAT changes. Thus, in prolonged steady state high flow, high velocity conditions, PAT comes to IAT−C5+/−C6, which accurately replicates the AAT.

While idle counter 248 and steps 108–116 are used to set PAT during start-up and low flow, low velocity conditions in an adaptive manner that take into account how long such operating conditions have persisted, use of idle counter 248 is not essential and persons of skill in the art will understand that other means and methods can also be used. For example, system 10 can temporarily retain some short time (e.g., 1 to 20 minutes) historical data on MAF and VSS, for example the duration of low speed low flow conditions (referred to herein as $(MAF,VSS)_{History}$), and use these in connection with current MAF,VSS values (referred to herein as $(MAF, VSS)_{Current}$) in an empirically determined look up table or matrix to determine a delay time DT during which PAT continues to be set equal to the smaller of IAT or LPAT. Just as with the use of idle counter 248, this implementation can provide DT values that are different for different operating history and conditions. Persons of skill in the art will understand based on the description herein how to implement such an arrangement.

Alternatively, once ERT>C4, the value of C5 and/or C6 can be chosen from an analogous matrix so that the offset applied to IAT to obtain SSAT depends, among other things, on a combination of the short term operating history e.g., $(MAF,VSS)_{History}$, and current conditions, e.g., $(MAF,VSS)_{Current}$. As process 100 continues to loop, C5 values would update as the operating conditions changed and the operating history aged, to converge, for example, on the values listed for example in the proceeding chart of C1–C6 values. Persons of skill in the art will understand based on the description herein how to implement such an arrangement.

In a still further implementation, the value used for C6 can be altered depending on $(MAF,VSS)_{History}$. The magnitude of C6 determines the number of cycles of loop back that are needed for the PAT values at the transition from low to high operating conditions to converge to PAT=IAT−C5 +/−C6. By using C6 values that depend on $(MAF,VSS)_{History}$ and/or $(MAF,VSS)_{Current}$, transient operating conditions can be accommodated. Thus, the present invention is not limited to the preferred embodiment utilizing an idle counter but includes any means and method, as for example, but not limited to those alternative means or methods described above (or combinations thereof) for providing a dynamically alterable PAT transition delay between low and high operating conditions. Persons of skill in the art will understand based on the description herein how to implement such an arrangement.

Thus, it will be apparent to those of skill in the art based on the description herein that the present invention provides a flexible and effective means and method for obtaining an estimated or predicted ambient air temperature surrounding the vehicle for use in efficiently and effectively controlling the operation of the vehicle and that such prediction is obtained without adding further sensors or other cost to the vehicle. This is true because the sensors and controller used in determining the PAT are already present on the vehicle and the processing time and resources used in carrying out the present invention place negligible additional burden on the vehicle management system.

It should also be appreciated that the exemplary embodiments are only examples, and are not intended to limit the scope, applicability, or configuration of the invention in any way. Rather, the foregoing detailed description provides those of skill in the art with a convenient roadmap for implementing the exemplary embodiments of the invention. Various changes may be made in the function and arrangement described in connection with the exemplary embodiments without departing from the spirit and scope of the invention as set forth in the appended claims.

What is claimed is:

1. A method for generating a Predicted Ambient Temperature (PAT) of air around a vehicle for controlling vehicle operation, based on vehicle Intake Air Temperature (IAT), vehicle speed (VSS), vehicle intake airflow (MAF), engine run time (ERT) and Last Predicted Ambient Temperature (LPAT), comprising the steps of:
    increasing a count value and generating the PAT based on IAT or LPAT when MAF and VSS are below respective thresholds and said count value has not yet reached a predetermined count value;
    decreasing the count value and generating the PAT based on IAT or LPAT when at least one of MAF and VSS exceeds or is equal to its respective threshold and said count value has not yet reached the predetermined count value;
    when said count value reaches the predetermined count value, determining whether ERT exceeds a corresponding threshold value; and
    in response to said determining step, generating the PAT based on IAT or LPAT if said ERT does not exceed the corresponding threshold value, otherwise generating the PAT based on an offset temperature that is obtained by subtracting an offset value from IAT.

2. The method of claim 1, wherein the count value is determined by an idle counter whose count increases when MAF and VSS are below their respective thresholds, and whose count decreases when at least one of MAF and VSS is equal to or above its respective threshold.

3. The method of claim 1, wherein the count value is determined by comparing current values of MAF, VSS with historical values of MAF, VSS.

4. The method of claim 1, wherein the step of generating the PAT based on an offset temperature further comprises setting PAT equal to LPAT minus or plus an incremental temperature according to whether or not the LPAT exceeds the offset temperature.

5. The method of claim 4, wherein the steps of increasing and generating the PAT, decreasing and generating the PAT, determining, and generating the PAT in response to said determining step are repeated multiple times and during each repetition of the step of generating the PAT in response to said determining step, the value of PAT obtained therefrom converges to the offset temperature plus or minus the incremental temperature.

6. The method of claim 1, further comprising using the generated PAT to modify control of a vehicle.

7. The method of claim 6, wherein said step of generating the PAT based on an offset temperature further comprises using the generated PAT while conducting an EONV test on the vehicle.

8. The method of claim 1, wherein the count value is determined in part by measuring a first duration during which MAF, VSS are below respective thresholds therefore.

9. The method of claim 8, wherein the duration of the count value depends in part on the first duration.

10. A system for temperature prediction comprising:
a) a program for obtaining a Predicting Ambient Temperature (PAT) of air surrounding a vehicle by:
increasing a count value and generating the PAT based on IAT or LPAT when MAF and VSS are below respective thresholds and said count value has not yet reached a predetermined count value;
decreasing the count value and generating the PAT based on IAT or LPAT when at least one of MAF and VSS exceeds or is equal to its respective threshold and said count value has not yet reached the predetermined count value;
when said count value reaches the predetermined count value, determining whether ERT exceeds a corresponding threshold value; and
in response to said determining, generating the PAT based on IAT or LPAT if said ERT does not exceed the corresponding threshold value, otherwise generating the PAT based on an offset temperature that is obtained by subtracting an offset value from IAT; and
b) signal bearing media bearing said program.

11. The system of claim 10, wherein the program sets PAT equal to LPAT minus or plus an incremental temperature according to whether or not the LPAT exceeds the offset temperature.

12. The system of claim 10, wherein the count value is determined by comparing current values of MAF, VSS with historical values of MAF, VSS.

13. A system for controlling in part operation of a vehicle using Predicted Ambient Temperature (PAT) value, comprising:
a controller comprising a processor and a memory coupled to the processor;
at least one interface unit coupled to the controller and configured to provide vehicle operating variables MAF, VSS, IAT, ERT and LPAT to the controller; and
a prediction program residing in the memory and being executed by the processor for providing the PAT of air surrounding the vehicle, wherein the prediction program comprises computer-executable instructions configured;
to increase a count value and to generate the PAT based on IAT or LPAT when MAF and VSS are below respective thresholds and said count value has not yet reached a predetermined count value;
to decrease the count value and to generate the PAT based on IAT or LPAT when at least one of MAF and VSS exceeds or is equal to its respective threshold and said count value has not yet reached the predetermined count value;
when said count value reaches the predetermined count value, to determine whether ERT exceeds a corresponding threshold value; and
to generate, in response to said determination, the PAT based on IAT or LPAT if said ERT does not exceed the corresponding threshold value, otherwise to generate the PAT based on an offset temperature that is obtained by subtracting an offset value from IAT.

14. The system of claim 13, wherein the prediction program sets the PAT equal to LPAT minus or plus an incremental temperature according to whether or not the LPAT exceeds the offset temperature.

15. The system of claim 13, wherein the processor operates in a loop to run the prediction program multiple times, each time causing PAT to be set to LPAT, IAT or other value depending on IAT, MAF, VSS, ERT and LPAT.

16. The system of claim 13, wherein in the prediction program the count value is further determined by comparing current values of MAF, VSS with historical values of MAF, VSS.

17. The system of claim 13, wherein the PAT or LPAT values are stored in memory.

18. The system of claim 17, wherein the processor uses PAT or LPAT while conducting an EONV test on the vehicle.

* * * * *